(12) United States Patent
Kuribayashi

(10) Patent No.: US 10,649,362 B2
(45) Date of Patent: May 12, 2020

(54) OPTICAL SCANNING DEVICE AND IMAGE FORMING APPARATUS

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/274,042

(22) Filed: Feb. 12, 2019

(65) Prior Publication Data
US 2019/0369520 A1 Dec. 5, 2019

(30) Foreign Application Priority Data
Jun. 1, 2018 (JP) ................. 2018-106248

(51) Int. Cl.
| | |
|---|---|
| *G03G 15/043* | (2006.01) |
| *G03G 15/04* | (2006.01) |
| *H04N 1/028* | (2006.01) |
| *H04N 1/193* | (2006.01) |
| *G03G 15/01* | (2006.01) |
| G03G 15/16 | (2006.01) |

(52) U.S. Cl.
CPC ....... *G03G 15/0435* (2013.01); *G03G 15/011* (2013.01); *G03G 15/04072* (2013.01); *H04N 1/0283* (2013.01); *H04N 1/1937* (2013.01); G03G 15/1605 (2013.01)

(58) Field of Classification Search
CPC .... G03G 15/04; G03G 15/011; G03G 15/041; G03G 15/043; G03G 15/0415; G03G 15/0435; G03G 15/04072; G03G 2215/04; G03G 2215/0404; H04N 1/0283; H04N 1/1937
See application file for complete search history.

(56) References Cited

U.S. PATENT DOCUMENTS

2009/0092417 A1* 4/2009 Shimomura ......... G03G 15/011
399/223
2018/0259873 A1 9/2018 Kuribayashi

FOREIGN PATENT DOCUMENTS

JP 2008-122706 A 5/2008

* cited by examiner

*Primary Examiner* — Thomas S Giampaolo, II
(74) *Attorney, Agent, or Firm* — Kim & Stewart LLP

(57) ABSTRACT

An optical scanning device includes light sources, a deflector deflecting light beams emitted from the light sources, a first lens transmitting the light beams deflected by the defector, and second lenses guiding the light beams transmitted from the first lens to respective surfaces to be scanned. The second lenses are arranged so that a first incident position of a first light beam emitted by a first light source and entering one of the second lenses is closer to the respective surface to be scanned along an optical axis of the first lens than a second incident position of a second light beam emitted by a second light source and entering another of the second lenses, and an incident angle of the second light beam with respect to the optical axis along a deflection direction by the deflector is greater than the incident angle of the first light beam.

20 Claims, 14 Drawing Sheets

OPTICAL SCANNING DEVICE AND IMAGE FORMING APPARATUS

CROSS-REFERENCE TO RELATED APPLICATION

This application is based upon and claims the benefit of priority from Japanese Patent Application No. 2018-106248, filed Jun. 1, 2018, the entire contents of which are incorporated herein by reference.

FIELD

Embodiments described herein relate generally to an optical scanning device for scanning a surface by deflecting light and an image forming apparatus provided with the same.

BACKGROUND

Conventionally, for example, a 4-tandem type color copying machine having four photoconductive drums (for yellow, magenta, cyan and black) horizontally arranged side by side is known as a color copying machine or more generally as an image forming apparatus. In such a color copying machine, for example, one polygon mirror is arranged between the second photoconductive drum and the third photoconductive drum.

Such a color copying machine has four light sources used for emitting laser beams towards the polygon mirror based on image signals for respective colors after color separation. For example, the four light sources are grouped into two sets and arranged on the left side and the right side with respect to the polygon mirror. The four light sources emit laser beams in different colors to respective surfaces of the photoconductive drums, which have been charged to a predetermined potential, to form electrostatic latent images thereon.

Furthermore, such a color copying machine has a plurality of mirrors between the polygon mirror and the respective photoconductive drums for guiding the laser beams having different colors. The plurality of mirrors and the polygon mirror constitute a scanning optical system. The scanning optical system includes a first scanning optical system that scans surfaces of the two photoconductive drums on the left side, and a second scanning optical system that scans surfaces of the two photoconductive drums on the right side.

The scanning optical system on the left side reflects the laser beams emitted from the two light sources on the left side on the same reflecting surface of the polygon mirror to deflect the laser beams in a main scanning direction and guides the laser beams via a plurality of mirrors to scan the surfaces of the two photoconductive drums on the left side. The scanning optical system on the right side reflects the laser beams emitted from the two light sources on the right side on another reflecting surface of the polygon mirror to deflect the laser beams in a main scanning direction and guides the laser beams via a plurality of mirrors to scan the surfaces of the two photoconductive drums on the right side.

Specifically, the respective laser beams emitted from the two light sources on the left side are reflected by the same reflecting surface of the polygon mirror. The reflected laser beams are deflected in the main scanning direction by the rotation of the polygon mirror and then are guided to the two photoconductive drums on the left side through the scanning optical system for corresponding colors, respectively. Similarly, the laser beams emitted from the two light sources on the right side are reflected by another reflecting surface of the polygon mirror. The reflected laser beams are deflected in the main scanning direction by the rotation of the polygon mirror and then are guided respectively to the other two photoconductive drums on the right side through the scanning optical system for corresponding colors.

The laser beams emitted respectively from the two light sources on the left side and the two light sources on the right side are incident on the polygon mirror with an opening angle in the main scanning direction. For example, in an apparatus disclosed in Japanese unexamined patent application publication No. 2008-122706, the laser beam emitted from each light source is incident on the polygon mirror without any angle in a sub-scanning direction. Therefore, in the apparatus disclosed in Japanese unexamined patent application publication No. 2008-122706, a change in an optical path due to unevenness of the surface has little influence.

DETAILED DESCRIPTION

In accordance with an embodiment, an optical scanning device comprises a plurality of light sources, a deflector configured to deflect light beams emitted from the plurality of light sources; a first lens configured to transmit the light beams deflected by the defector, and a plurality of second lenses configured to guide the light beams transmitted from the first lens to respective surfaces to be scanned. The second lenses are arranged so that a first incident position of a first light beam emitted by a first light source and entering one of the second lenses is closer to the respective surface to be scanned along an optical axis of the first lens than a second incident position of a second light beam emitted by a second light source and entering another of the second lenses, and an incident angle of the second light beam with respect to the optical axis along a deflection direction by the deflector is greater than the incident angle of the first light beam.

Hereinafter, an embodiment is described in detail with reference to the accompanying drawings.

Figure 1:
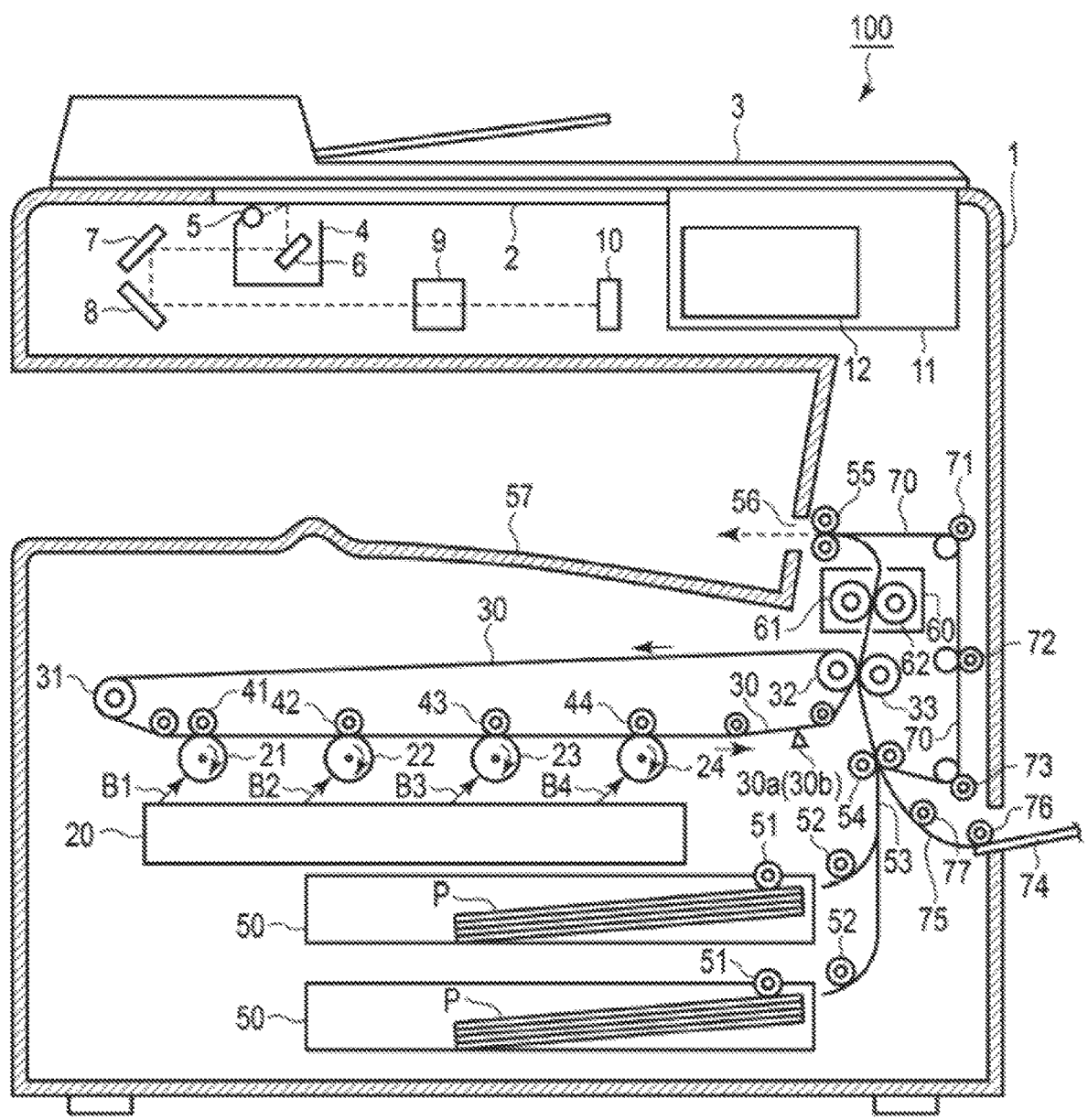
FIG. 1 is a schematic diagram of an image forming apparatus according to an embodiment.

As shown in FIG. 1, a color copying machine 100, which is an example of an image forming apparatus, has a transparent document table glass 2 for placing a document at the upper part of a main body 1. Above the document table glass 2, a one-side cover 3 that covers the upper surface of the document table glass 2 is arranged. A carriage 4 is arranged in the main body 1 at the lower surface side of the document table glass 2. The carriage 4 houses an exposure lamp 5 and a mirror 6 therein. In the vicinity of the carriage 4, mirrors 7 and 8, a variable power lens block 9 and a CCD (Charge Coupled Device) 10 are arranged.

The carriage 4 reciprocates along the lower surface of the document table glass 2. The exposure lamp 5 irradiates a document placed on the document table glass 2 with light as the carriage 4 reciprocates. The light reflected by the document passes through the mirrors 6, 7 and 8, and the variable power lens block 9, and is incident on the CCD 10. The CCD 10 performs a photoelectric conversion on the reflected light from the document to output an image signal.

In the vicinity of the document table glass 2, a control panel 11 for setting operation conditions is arranged. The control panel 11 has a touch panel type liquid crystal display 12.

The image signal output by the CCD 10 is input to an exposure unit 20. The exposure unit 20 performs a color separation on the image signal received from the CCD 10 to obtain color components, for example, yellow, magenta, cyan and black. Four light sources L1, L2, L3 and L4 described later emit laser beams B1, B2, B3 and B4 corresponding to image signals separated into respective color components, respectively. Hereinafter, the laser beams in respective colors include a laser beam B1 corresponding to an image signal for yellow, a laser beam B2 corresponding to an image signal for magenta, a laser beam B3 corresponding to an image signal for cyan, and a laser beam B4 corresponding to an image signal for black.

The laser beam B1 is emitted towards a surface of a photoconductive drum 21 which is an image carrier for yellow via a predetermined independent scanning optical system for yellow. Likewise, the laser beam B2 is emitted to a surface of a photoconductive drum 22 for magenta via a predetermined scanning optical system for magnate. The laser beam B3 is emitted to a surface of a photoconductive drum 23 for cyan via a predetermined scanning optical system for cyan. The laser beam B4 is emitted to a surface of a photoconductive drum 24 for black via a predetermined scanning optical system for black. The surfaces of the photoconductive drum 21, 22, 23 and 24 are irradiated with the laser beams B1, B2, B3 and B4, respectively.

The photoconductive drums 21, 22, 23 and 24 are arranged in this order substantially horizontally from the left to the right shown in FIG. 1 at regular intervals. The rotation axes of the photoconductive drums 21, 22, 23 and 24 are arranged side by side horizontally at an equal pitch in parallel with each other.

An intermediate transfer belt 30 is arranged above these photoconductive drums 21, 22, 23 and 24. The endless intermediate transfer belt 30 is wound around a driving roller 31 and a driven roller 32 to be stretched. The intermediate transfer belt 30 receives a power from the driving roller 31 to rotate counterclockwise in FIG. 1 at the same peripheral velocity as those of the photoconductive drums 21, 22, 23 and 24.

Primary transfer rollers 41, 42, 43 and 44 are arranged at the inner side of the intermediate transfer belt 30. The primary transfer rollers 41, 42, 43 and 44 are respectively arranged to face the photoconductive drums 21, 22, 23 and 24 across the intermediate transfer belt 30. The primary transfer rollers 41, 42, 43 and 44 respectively generate transfer voltages among the photoconductive drums 21, 22, 23 and 24 to transfer developer images in the respective colors formed on the photoconductive drums 21, 22, 23 and 24 onto the intermediate transfer belt 30 in an overlapped manner.

Registration sensors 30a and 30b are arranged to face the intermediate transfer belt 30 on a downstream side of the photoconductive drum 24 for black. The registration sensors 30a and 30b are arranged in a separated manner in a width direction of the intermediate transfer belt 30. The registration sensors 30a and 30b respectively detect registration patterns for respective colors (not shown) formed on the intermediate transfer belt 30 to detect position shift in the images of respective colors.

Figure 2:
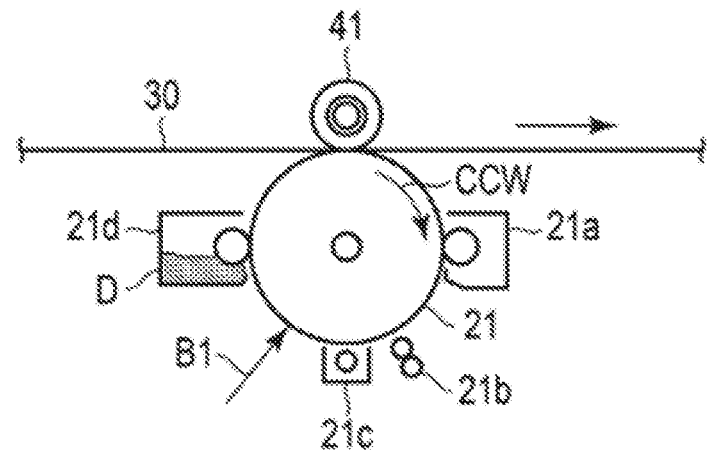
FIG. 2 is a schematic diagram illustrating peripheral components of a photoconductive drum of the image forming apparatus shown in FIG. 1.

Next, with reference to FIG. 2, the components in the vicinity of the photoconductive drum 21 for yellow are described.

A cleaner 21a, a charge removing lamp 21b, a charging unit 21c, and a developing unit 21d are arranged around the photoconductive drum 21 in order in a clockwise direction shown in FIG. 2. The cleaner 21a removes a developer left on the surface of the photoconductive drum 21. The charge removing lamp 21b removes charge left on the surface of the photoconductive drum 21. The charging unit 21c charges the surface of the photoconductive drum 21 with predetermined electrostatic charge.

The laser beam B1 emitted from the exposure unit 20 is emitted to the surface of the photoconductive drum 21 charged by the charging unit 21c. The laser beam B1 forms an electrostatic latent image corresponding to the image signal for yellow on the surface of the photoconductive drum 21 charged to a predetermined potential. The developing unit 21d develops the electrostatic latent image on the surface of the photoconductive drum 21 by supplying yellow developer D to the surface of the photoconductive drum 21 to form a yellow developer image.

The components in the vicinity of each of the other photoconductive drums 22, 23 and 24 are the same as those of the photoconductive drum 21, and thus the detailed description for the components in the vicinity of each of the other photoconductive drums 22, 23 and 24 is omitted. The magenta developer D, the cyan developer D, and the black developer D are supplied to the photoconductive drums 22, 23, and 24, respectively to form developer images in respective colors.

As shown in FIG. 1, in the color copying machine 100, a plurality of sheet feed cassettes 50 is arranged below the exposure unit 20. These sheet feed cassettes 50 accommodate a large number of sheets P in different sizes. A pickup roller 51 and a sheet feed roller 52 are provided at a taking-out port of each of these sheet feed cassettes 50.

Each pickup roller 51 rotates while contacting with the sheet P in the corresponding sheet feed cassette 50 to pick up the sheets P one by one. Each sheet feed roller 52 feeds the sheet P picked up by each pickup roller 51 to a conveyance path 53. The conveyance path 53 extends to a sheet discharge port 56 via a registration roller 54, the driven roller 32, a fixing unit 60, and a sheet discharge roller 55. The sheet discharge port 56 faces a sheet discharge tray 57.

A secondary transfer roller 33 is arranged to face the driven roller 32 across the intermediate transfer belt 30 and the conveyance path 53. The secondary transfer roller 33 transfers the developer images in respective colors formed on the intermediate transfer belt 30 in an overlapped manner onto the sheet P fed via the registration roller 54. The secondary transfer roller 33 functions as a transfer module, together with the intermediate transfer belt 30, the driving roller 31, the driven roller 32, and the primary transfer rollers 41, 42, 43 and 44.

A conveyance path 70 extending from an end of the conveyance path 53 to a position on the upstream side of the registration roller 54 is provided in the color copying machine 100. The conveyance path 70 functions as a reverse conveyance path for reversing the front and back surfaces of the sheet P and returning it to the conveyance path 53. Sheet feed rollers 71, 72 and 73 are arranged on the conveyance path 70.

A manual feed tray 74 is detachably arranged on a side wall of the main body 1. An end of a conveyance path 75 is connected to the manual feed tray 74, and the other end thereof is connected to the conveyance path 53 on the upstream side of the registration roller 54. A sheet feed roller 77 is arranged on the conveyance path 75 between a pickup roller 76 and the registration roller 54. The pickup roller 76 picks up the sheets on the manual feed tray 74 one by one. The sheet feed roller 77 supplies the sheet picked up by the pickup roller 76 to the registration roller 54.

The fixing unit 60 includes a heat roller 61 and a pressure roller 62. The fixing unit 60 fixes the developer image transferred onto the sheet P to the sheet P by heating the conveyed sheet P with the heat roller 61 at 100° C., for example while pressurizing the conveyed sheet P with the pressure roller 62.

Figure 3:
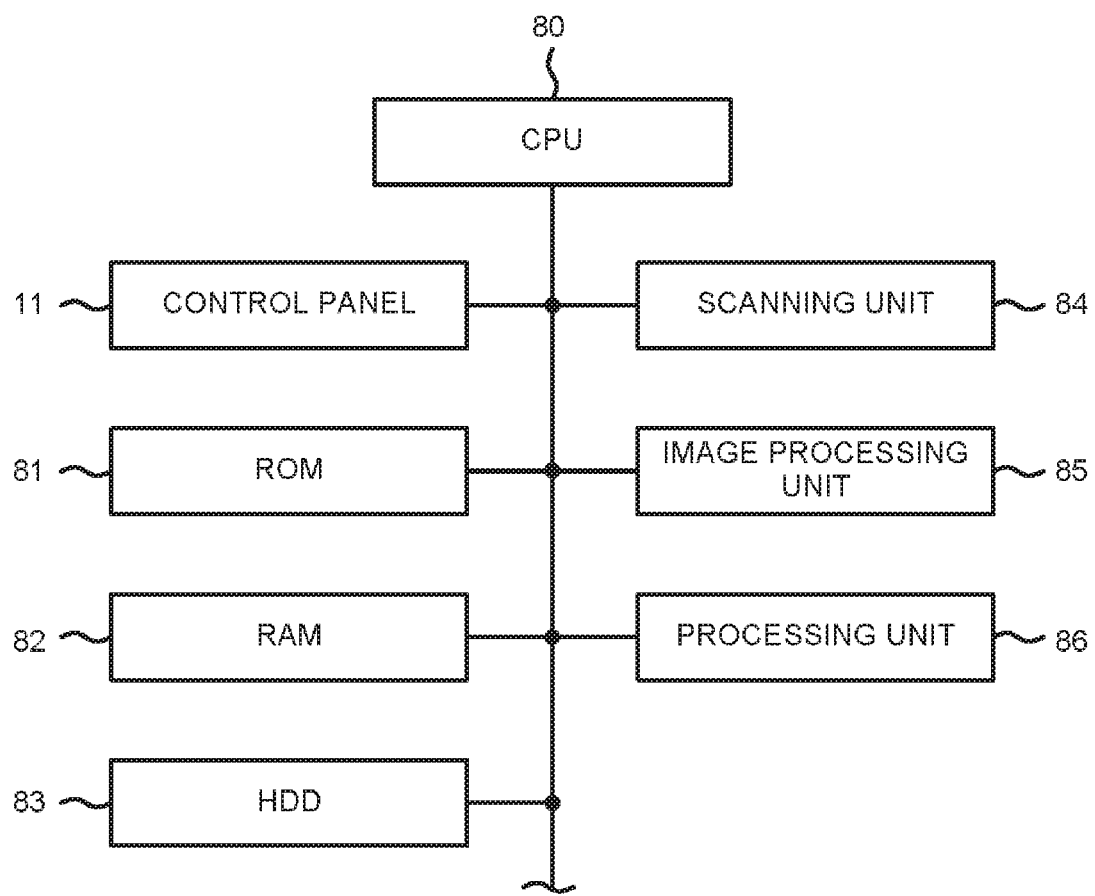
FIG. 3 is a block diagram of a control system of the image forming apparatus shown in FIG. 1.

Next, with reference to FIG. 3, a control circuit of the color copying machine 100 is described.

A CPU (Central Processing Unit) 80 for controlling the operation of the color copying machine 100 is provided in the control circuit of the color copying machine 100. The CPU 80 is connected to a control panel 11, a ROM (Read Only Memory) 81, a RAM (Random Access Memory) 82, an HDD (Hard Disk Drive) 83, a scanning unit 84, an image processing unit 85 and a processing unit 86.

In addition to the touch panel type liquid crystal display 12, the control panel 11 has a numeric keypad, a start key, a copy key for setting an image forming mode, and a scanning key for setting an image reading mode, which are not shown. The ROM 81 stores various control programs. The RAM 82 stores various data temporarily. The hard disk drive 83 stores image data.

The scanning unit 84 includes the carriage 4, the exposure lamp 5, the mirrors 6, 7 and 8, the variable power lens block 9, and the CCD 10 as described above. The scanning unit 84 optically scans an image on a document placed on the document table glass 2 to read the image. The image processing unit 85 appropriately processes the image read by the scanning unit 84.

The processing unit 86 includes the exposure unit 20, the photoconductive drums 21, 22, 23 and 24, the components shown in FIG. 2 around the respective photoconductive drums, the intermediate transfer belt 30, the driving roller 31, the driven roller 32, the primary transfer rollers 41, 42, 43 and 44, the secondary transfer roller 33, the conveyance path 53, the fixing unit 60, the conveyance path 70 and the like. The processing unit 86 forms an image processed by the image processing unit 85 on the sheet P.

Figure 4:
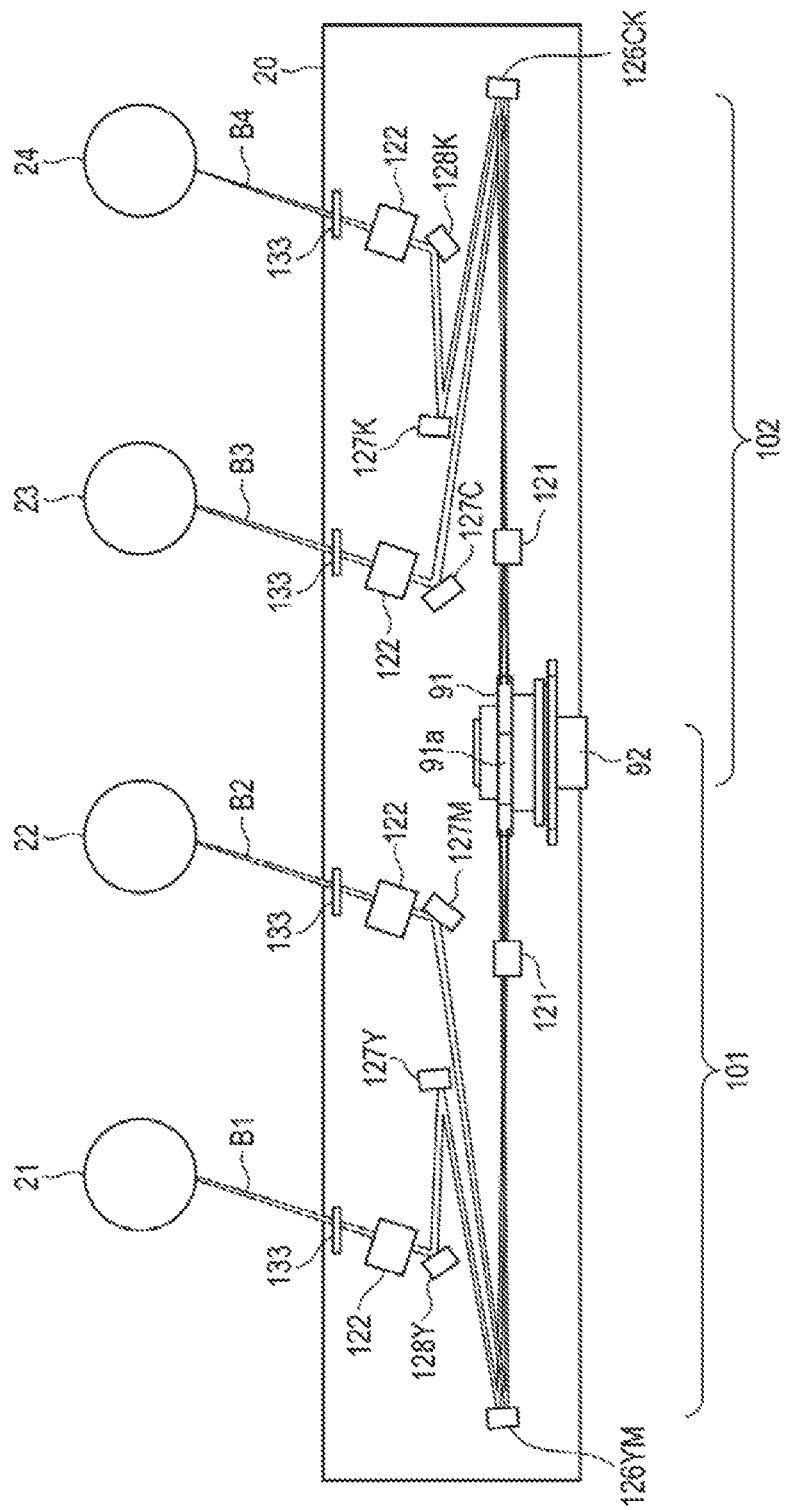
FIG. 4 is a schematic diagram of an exposure unit according to a first embodiment.

Below, with reference mainly to FIG. 4 to FIG. 7, the exposure unit 20 is described in detail. As shown in FIG. 4, the exposure unit 20 is arranged below the four photoconductive drums 21, 22, 23 and 24 to face them in a separated manner.

Figure 5:
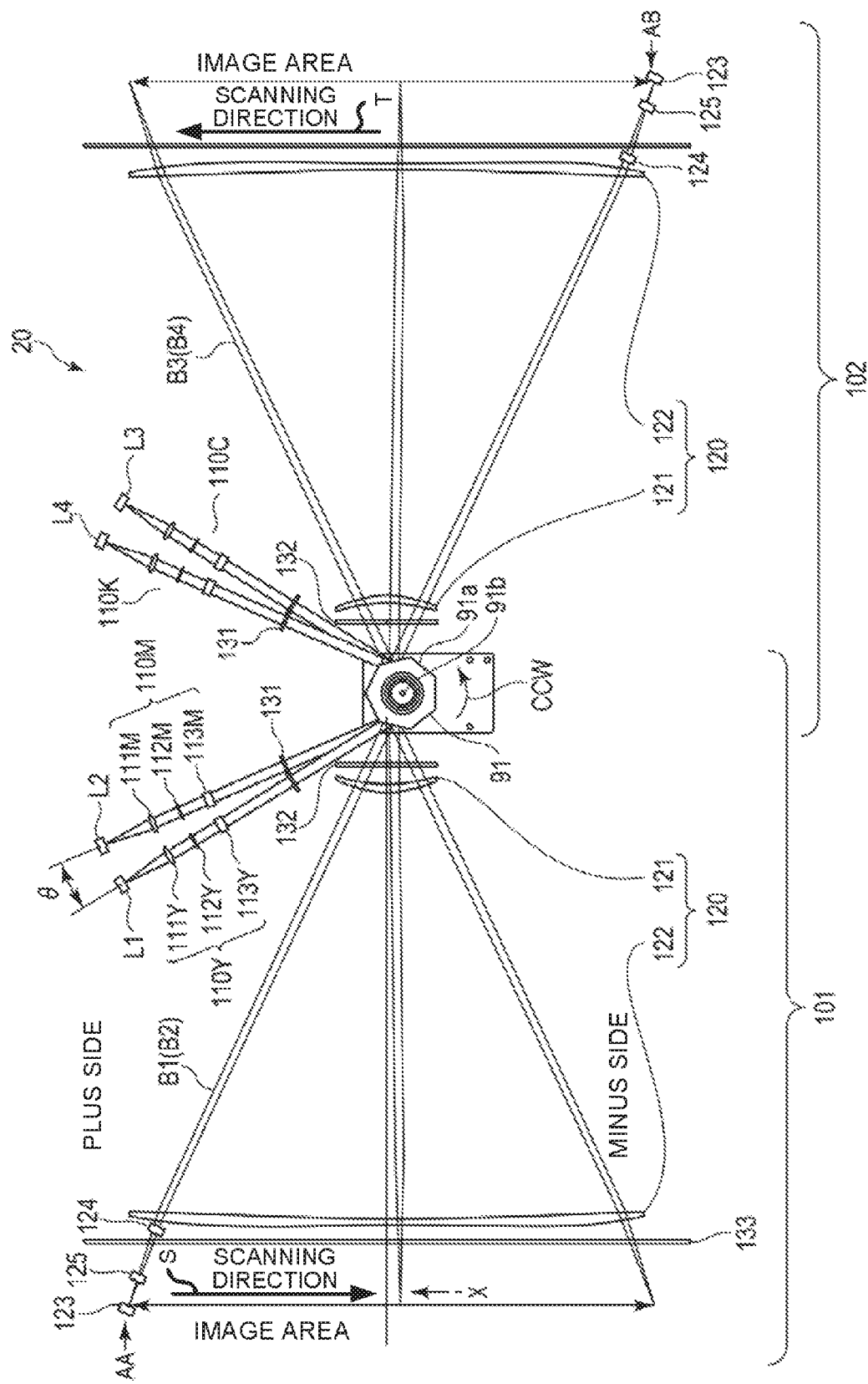
FIG. 5 is a plan view of an optical system of the exposure unit shown in FIG. 4.
Figure 6:
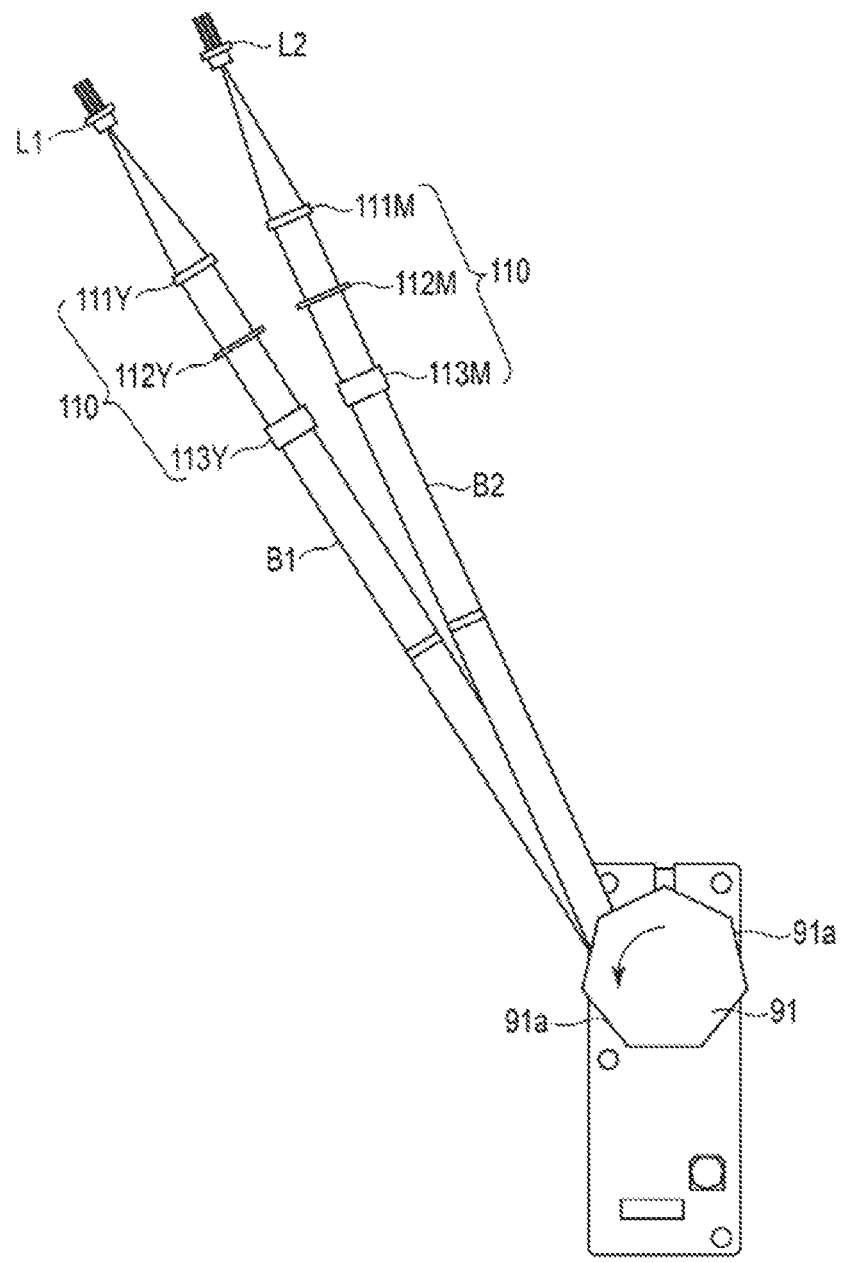
FIG. 6 is a partially enlarged view of a portion of FIG. 5.

As shown in FIG. 5 and FIG. 6, the exposure unit 20 has a polygon mirror 91 (deflector) having a regular polygonal prism shape. In the present embodiment, the polygon mirror 91 has a regular heptagonal prism shape having seven reflecting surfaces 91a arranged on respective sides of the regular heptagon. The polygon mirror 91 is rotatable around a rotation axis parallel to the seven reflecting surfaces 91a. The seven reflecting surfaces 91a form an outer circumferential surface of the polygon mirror 91 in a rotation direction CCW of the polygon mirror 91. The number of the reflecting surfaces 91a is not limited to seven, and can be set to any number as long as the polygon mirror 91 has a regular polygonal prism shape.

Figure 7:
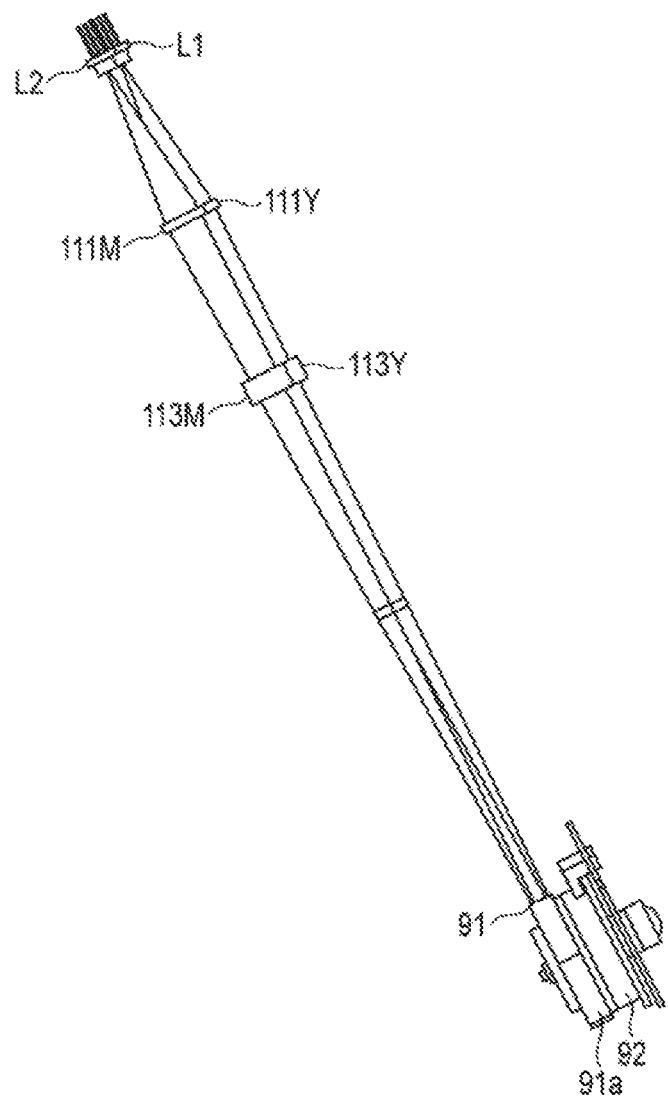
FIG. 7 is a schematic diagram of the structures shown in FIG. 6 as viewed from a side direction.

The exposure unit 20 has a motor 92 for rotating the polygon mirror 91 in a main scanning direction (i.e., a direction indicated by an arrow in FIG. 5) at a predetermined speed. In the present embodiment, the motor 92 is provided coaxially with the polygon mirror 91 as shown in FIG. 4 and FIG. 7. For example, the polygon mirror 91 is integrally attached to a rotation axis of the motor 92. However, there is no need to provide the motor 92 coaxially with the polygon mirror 91, and there is no need to provide the motor 92 integrally with the polygon mirror 91.

The exposure unit 20 further includes light sources L1, L2, L3 and L4, and a plurality of optical elements. The plurality of optical elements guides the laser beams B1, B2, B3 and B4 in four colors emitted from the light sources L1, L2, L3 and L4. The plurality of optical elements forms four independent optical paths for guiding the laser beams B1, B2, B3 and B4 in four colors to the surfaces of the photoconductive drums 21, 22, 23 and 24 correspondingly. In the present embodiment, the optical paths for the four colors are divided into two sets, each set composed of optical paths for two colors, and a plurality of optical elements of each set of optical paths is respectively arranged on the left and right sides with the polygon mirror 91 arranged therebetween.

Specifically, in the present embodiment, the polygon mirror 91 is arranged between the second photoconductive drum 22 and the third photoconductive drum 23 in FIG. 4. The photoconductive drum 21 for yellow and the photoconductive drum 22 for magenta are arranged on the left side of the polygon mirror 91 in FIG. 4, and the photoconductive drum 23 for cyan and the photoconductive drum 24 for black are arranged on the right side in FIG. 4. The polygon mirror 91 is arranged in such a manner that a rotation axis thereof is orthogonal to the rotation axes of the photoconductive drums 21, 22, 23 and 24 (i.e., extending in a vertical direction in the present embodiment).

In the exposure unit 20, two scanning optical systems 101 and 102 each including a plurality of optical elements are arranged on both sides (left and right sides in FIG. 4) with the single polygon mirror 91 therebetween. The two scanning optical systems 101 and 102 are optically symmetrical with respect to a plane parallel to rotation centers of the photoconductive drums 21, 22, 23 and 24 and including the rotation axis of the polygon mirror 91. The polygon mirror 91 is included in each of the scanning optical systems 101 and 102.

As shown in FIG. 5, the scanning optical system 101 on the left side has light sources L1 and L2 for emitting the laser beams B1 and B2 towards the surfaces of the two photoconductive drums 21 and 22, respectively. Each of the light sources L1 and L2 is, for example, a laser diode, and the light sources L1 and L2 emit the laser beam B1 corresponding to the image signal for yellow after the color separation and the laser beam B2 corresponding to the image signal for magenta after the color separation, respectively.

In the scanning optical system 101, the laser beams B1 and B2 emitted from the light sources L1 and L2 are reflected by the same reflecting surface 91a of the polygon mirror 91, and then are deflected in the main canning direction along the rotation direction CCW (counterclockwise direction in FIG. 5) as the polygon mirror 91 rotates to scan the surfaces of the two photoconductive drums 21 and 22, respectively.

Similarly, the scanning optical system 102 on the right side shown in FIG. 5 has light sources L3 and L4 for emitting the laser beams B3 and B4 towards surfaces of the two photoconductive drums 23 and 24, respectively. The scanning optical system 102 reflects the laser beams B3 and B4 emitted from the light sources L3 and L4 with another same reflecting surface 91a of the polygon mirror 91 and deflects the reflected laser beams B3 and B4 in the main canning direction along the rotation direction CCW as the polygon mirror 91 rotates to scan the surfaces of the two photoconductive drums 23 and 24, respectively.

Here, the scanning optical system 101 on the left side shown in FIG. 5 is described in detail.

The polygon mirror 91 rotates while reflecting the laser beams B1 and B2 emitted from the light sources L1 and L2 with the same reflecting surface 91a. In this way, two image planes arranged at predetermined positions, i.e., the surfaces of the corresponding photoconductive drums 21 and 22 are scanned in the main scanning direction at a predetermined linear velocity. At this time, the photoconductive drums 21 and 22 rotate in the sub-scanning direction, and in this way, electrostatic latent images corresponding to the image signals for the both colors are formed on the surfaces of the photoconductive drums 21 and 22 correspondingly.

As shown in FIG. 5 and FIG. 6, the two light sources L1 and L2 in the scanning optical system 101 are arranged at different angular positions along the rotation direction CCW (a direction indicated by an arrow shown in FIG. 6) of the polygon mirror 91 as viewed from above. In other words, the two light sources L1 and L2 are arranged in such a manner that an incident direction of the laser beam B1 and an incident direction of the laser beam B2 have an opening angle θ1 therebetween. Specifically, in the present embodiment, the light source L1 among the two light sources is arranged on the downstream side along the rotation direction CCW of the polygon mirror 91, and the light source L2 is arranged on the upstream side along the rotation direction CCW.

As shown in FIG. 7, in the present embodiment, the two light sources L1 and L2 are slightly shifted in a direction parallel to the rotation axis of the polygon mirror 91. For this reason, the positions where the laser beams B1 and B2 respectively emitted from the light sources L1 and L2 are reflected by the same reflecting surface 91a of the polygon mirror 91 are slightly different in the direction parallel to the rotation axis of the polygon mirror 91.

Furthermore, pre-deflection optical systems 110Y and 110M are arranged on the optical paths between the light sources L1 and L2 and the polygon mirror 91, respectively. The pre-deflection optical systems 110Y and 110M are contained in the scanning optical system 101. By making angular positions of the two light sources L1 and L2 with respect to the polygon mirror 91 different from each other, it is possible to arrange independent pre-deflection optical systems 110Y and 110M without overlapping with each other on both optical paths of the laser beams B1 and B2.

The two sets of pre-deflection optical systems 110Y and 110M respectively corresponding to the light sources L1 and L2 include finite focus lenses 111Y and 111M, diaphragms 112Y and 112M, and cylinder lenses 113Y and 113M, respectively. With the finite focus lenses 111Y and 111M, the laser beams B1 and B2 emitted from the light sources L1 and L2 have a predetermined convergence property. With the diaphragms 112Y and 112M, the laser beams B1 and B2 passing through the finite focus lenses 111Y and 111M can have any sectional beam shape. With the cylinder lenses 113Y and 113M, the laser beams B1 and B2 passing through the diaphragms 112Y and 112M can further have a predetermined convergence property in the sub-scanning direction.

The pre-deflection optical systems 110Y and 110M adjust the sectional beam shapes of the laser beams B1 and B2 emitted from the light sources L1 and L2 to predetermined shapes and guide them to the reflecting surface 91a of the polygon mirror 91. The optical axes (light advancing directions) of the pre-deflection optical systems 110Y and 110M and the rotation axis of the polygon mirror 91 are orthogonal to each other.

As shown in FIG. 5, a post-deflection optical system 120, which guides the laser beams B1 and B2 reflected by the reflecting surface 91a of the polygon mirror 91 to the surfaces of the photoconductive drums 21 and 22, has fθ lenses 121 and 122. The post-deflection optical system 120 is contained in the scanning optical system 101. The post-deflection optical system 120 is arranged between the polygon mirror 91 and the image planes, i.e., the surfaces of the photoconductive drums 21 and 22.

Only one fθ lens 121 on the upstream side in the vicinity of the polygon mirror 91 is arranged on the optical paths of the laser beams B1 and B2. On the other hand, only one fθ lens 122 on the downstream side in the vicinity of the photoconductive drums 21 and 22 is shown in FIG. 5; however, in the present embodiment, as described later, one fθ lens 122 is independently arranged for each color.

The fθ lenses 121 and 122 are double imaging lenses for optimizing the shape and position on the image planes of the laser beams B1 and B2 deflected (scanned) by the polygon mirror 91. In the present embodiment, the fθ lens 121 is arranged on the upstream side in the vicinity of the polygon mirror 91, and the fθ lenses 122 (1221, 1222) for respective colors are arranged on the downstream side in the vicinity of the image planes. The fθ lens 122 on the downstream side is located in the vicinity of a third cover glass 133 described later.

In order to adjust the horizontal synchronization of the laser beams B1 and B2 passing through the fθ lenses 121 and 122, the post-deflection optical system 120 includes a photodetector 123 for horizontal synchronization for detecting a part of the laser beam B1 at an end (scanning position AA) on the scanning start side of the laser beam B1.

FIG. 5 shows a plan view of the laser beam B1 and shows that a reflection mirror 124 for reflecting the laser beam B1 towards the photodetector 123 is provided on the optical path from the fθ lens 122 to the photodetector 123. Furthermore, between the reflection mirror 124 and the photodetector 123, an optical path correction element 125 is arranged for guiding the laser beam B1 reflected towards the photodetector 123 by the reflection mirror 124 onto a detection surface of the photodetector 123.

As shown in FIG. 4, the post-deflection optical system 120 includes a plurality of reflection mirrors 126YM, 127Y, 127M and 128Y for reflecting the laser beams B1 and B2 passing through the fθ lens 121 towards the corresponding photoconductive drums 21 and 22. The reflection mirrors 126YM, 127Y and 128Y reflect the laser beam B1 towards the surface of the photoconductive drum 21. The reflection mirrors 126YM and 127M reflect the laser beam B2 towards the surface of the photoconductive drum 22. However, in FIG. 5, since the laser beams B1 and B2 are shown in an overlapped state, illustration of the reflection mirrors 126YM, 127Y, 127M and 128Y is omitted.

A first cover glass 131 is arranged between the pre-deflection optical system 110 and the polygon mirror 91. A second cover glass 132 is arranged between the polygon mirror 91 and the post-deflection optical system 120. When the polygon mirror 91 is boxed, the first cover glass 131 covers an entrance of the laser beam and the second cover glass 132 covers an exit of the laser beam as a countermeasure against wind noise generated when the polygon mirror 91 rotates.

Furthermore, a third cover glass 133 is provided between the fθ lens 122 and the photoconductive drums 21 and 22, respectively. The third cover glass 133 covers an exit of the laser beams B1 and B2 from which the laser beams B1 and B2 are emitted from the housing of the exposure unit 20.

Next, the scanning optical system 102 on the right side in FIG. 5 is briefly described.

The polygon mirror 91 rotates while reflecting the laser beams B3 and B4 emitted from the light sources L3 and L4 with the same reflecting surface 91a of the polygon mirror 91. As a result, with the polygon mirror 91, two image planes arranged at predetermined positions, i.e., the surfaces of the corresponding photoconductive drums 23 and 24 are scanned in the main scanning direction at a predetermined linear velocity.

At this time, the photoconductive drums 23 and 24 rotate in the sub-scanning direction, and in this way, electrostatic latent images corresponding to the image signals for the both colors are formed on the surfaces of the photoconductive drums 23 and 24 charged to predetermined potential correspondingly.

The two light sources L3 and L4 in the scanning optical system 102 are arranged at different angular positions along the rotation direction CCW of the polygon mirror 91 similarly to the light sources L1 and L2 of the scanning optical system 101 described above. In the present embodiment, the light source L3 among the two light sources is arranged on the upstream side along the rotation direction CCW of the polygon mirror 91, and the light source L4 is arranged on the downstream side along the rotation direction CCW. The two light sources L3 and L4 are slightly shifted in a direction parallel to a rotation axis 91b of the polygon mirror 91.

Furthermore, pre-deflection optical systems 110C and 110K are arranged between the light sources L3 and L4 and the polygon mirror 91, respectively. The post-deflection optical system 120 is arranged between the polygon mirror 91 and the image plane, i.e., the surfaces of the corresponding photoconductive drums 23 and 24. The pre-deflection optical systems 110C and 110K and the post-deflection optical system 120 have approximately the same structures as the pre-deflection optical systems 110Y and 110M and the post-deflection optical system 120 of the above scanning optical system 101, and are optically symmetrical as well. Therefore, the description of the pre-deflection optical systems 110C and 110K and the post-deflection optical system 120 of the scanning optical system 102 on the right side in FIG. 5 is omitted.

Here, a direction in which the laser beams B1, B2, B3 and B4 are deflected (scanned) by the polygon mirror 91 (a direction parallel to rotation axes of the photoconductive drums 21, 22, 23 and 24) is referred to as the "main scanning direction", and a direction parallel to the rotation axis of the polygon mirror 91 which is a deflector is referred to as the "sub-scanning direction". Therefore, the main scanning direction is perpendicular to directions parallel to optical axes of the optical systems and the direction parallel to the rotation axis of the polygon mirror 91, respectively.

In the present embodiment, since the scanning optical system 101 and the scanning optical system 102 are arranged on the left and right sides with the polygon mirror 91 therebetween, if the polygon mirror 91 is rotated in a fixed direction, the scanning direction of the photoconductive drums 21 and 22 by the scanning optical system 101 and the scanning direction of the photoconductive drums 23 and 24 by the scanning optical system 102 are opposite to each other. Specifically, in FIG. 5, in a case in which a side on which the light sources L1, L2, L3, and L4 are located with respect to the polygon mirror 91 (i.e., upper side of the paper surface) is assumed as a plus side, and the opposite side thereof (i.e., lower side of the paper surface) is assumed as a minus side, the scanning optical system 101 scans the image planes from the plus side to the minus side, which is indicated by an arrow S, and the scanning optical system 102 scans the image planes from the minus side to the plus side, which is indicated by an arrow T.

In order to align a writing timing of the main scanning direction of the laser beams B1, B2, B3 and B4 using the scanning optical system 101 and the scanning optical system 102, the photodetectors 123 for horizontal synchronization are provided on the upstream side in the main scanning directions of the scanning optical systems 101 and 102. Therefore, in the present embodiment, as shown in FIG. 5, the photodetector 123 for horizontal synchronization is arranged at a scanning position AA on the upstream side in the main scanning direction on the plus side of an image area in the scanning optical system 101, and the photodetector 123 for horizontal synchronization is arranged at a scanning position AB on the upstream side in the main scanning direction on the minus side of an image area in the scanning optical system 102.

Figure 8:
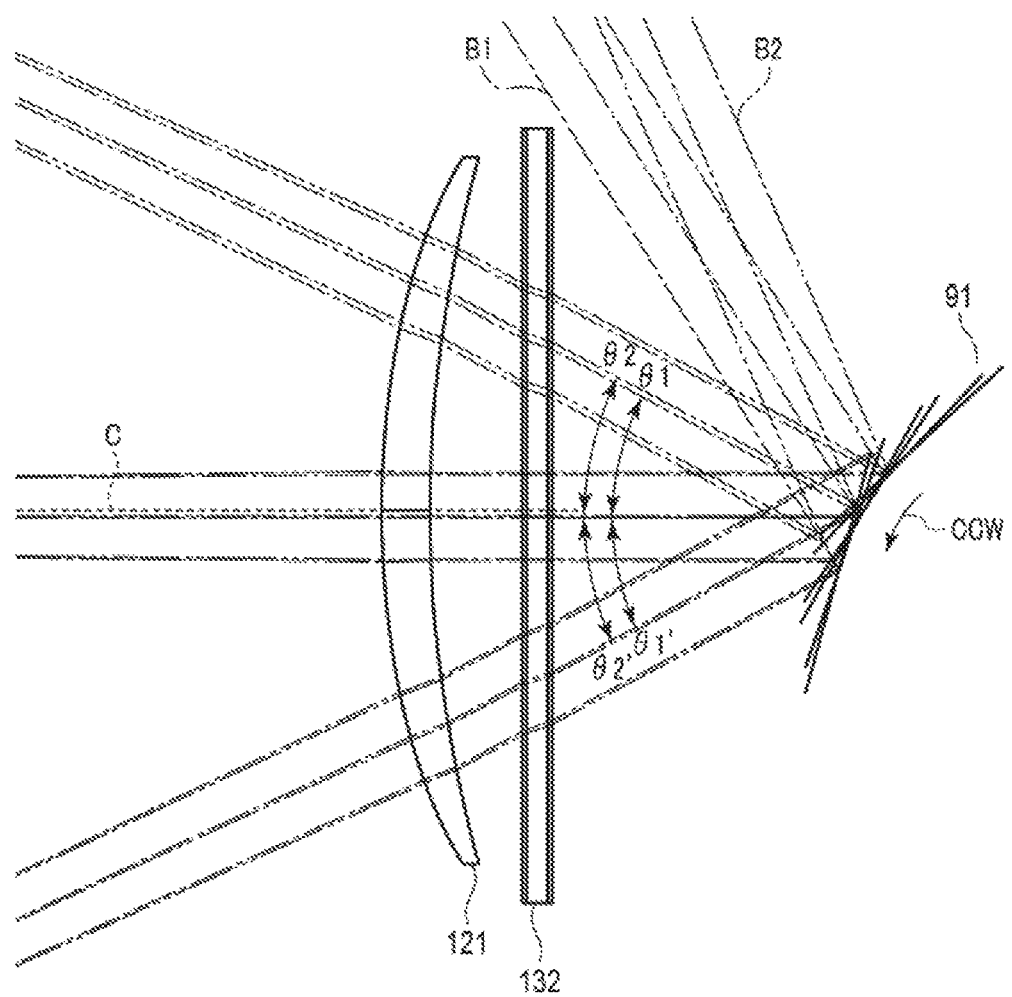
FIG. 8 is a partially enlarged view of another portion of FIG. 5.

FIG. 8 is a diagram illustrating traces of the laser beams B1 and B2 emitted to the surfaces of the photoconductive drums 21 and 22 after the beams B1 and B2 are emitted from the two light sources L1 and L2 of the scanning optical system 101 and then reflected by the same reflecting surface 91a of the polygon mirror 91. In FIG. 8, for convenience of description, the laser beams B1 and B2 reflected by the polygon mirror 91 are overlapped with each other. However, since the incident angles in the main scanning direction of the laser beams B1 and B2 incident on the polygon mirror 91 from the light sources L1 and L2 are different from each other, the laser beams B1 and B2 do not scan the surfaces of the photoconductive drums 21 and 22 in the main scanning direction at the same timing. In FIG. 8, the laser beam B1 is indicated by a dashed line and the laser beam B2 is indicated by a two-dot chain line. In FIG. 8, the optical axis C of the fθ lens 121 is shown by a broken line.

Here, it is assumed that an optical axis C of the fθ lens 121 coincides with an axis passing through the center in the main scanning direction of the image plane. The polygon mirror 91 deflects the laser beam B1 at a deflection angle of θ1 on the plus side and θ1' on the minus side in the main scanning direction with the optical axis C as the center. Likewise, the polygon mirror 91 deflects the laser beam B2 at a deflection angle of θ2 on the plus side and θ2' on the minus side in the main scanning direction with an optical axis passing through the center in the main scanning direction of the surface of the photoconductive drum 22 as the center. At this time, if the rotation axis 91b of the polygon mirror 91 deflecting the laser beams B1 and B2 rotates by the same rotation angle to perform deflection, θ1=θ2 and θ1'=θ2'.

In the scanning optical system 101 of the present embodiment, as described above, the incident angles in the main scanning direction of the laser beams B1 and B2 incident on the reflecting surface 91a of the polygon mirror 91 from the light sources L1 and L2 are different. Here, the incident angle refers to an angle of each the laser beams B1 and B2 with respect to the optical axis C. Therefore, according to the present embodiment, it can be known that there is a slight difference between a length in the main scanning direction of an area in which the laser beam B1 deflected in the main scanning direction at the deflection angle of θ1–θ1' is emitted to the surface of the photoconductive drum 21 and a length in the main scanning direction of an area in which the laser beam B2 deflected in the main scanning direction at the deflection angle of θ2–θ2' is emitted to the surface of the photoconductive drum 22 due to the difference in the incident angles therebetween (i.e., the opening angle θ).

The mechanism of a magnification deviation in the main scanning direction occurring in the image planes due to the difference in the incident angles is described below.

The polygon mirror 91 rotates in the CCW direction to reflect the laser beams B1 and B2 having different incident angles along the main scanning direction with the same reflecting surface 91a, and irradiates the surfaces of the photoconductive drums 21 and 22 with the laser beams B1 and B2, respectively. Therefore, a rotation angle range of the reflecting surface 91a which can irradiate the photoconductive drum 21 with one laser beam B1 and a rotation angle range of the reflecting surface 91a which can irradiate the photoconductive drum 22 with the other laser beam B2 are shifted in the main scanning direction by the difference in the incident angle.

Figure 9:
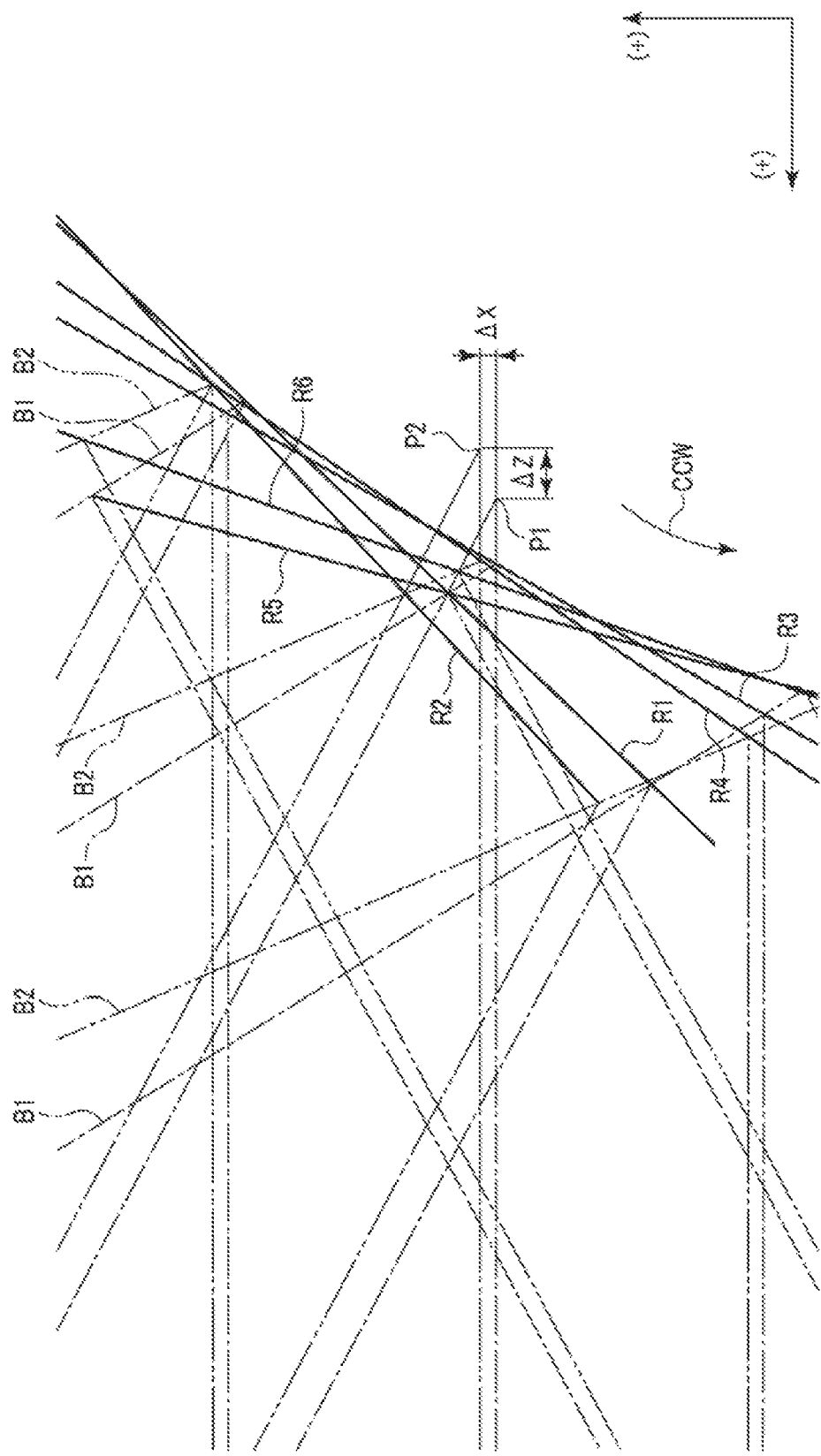
FIG. 9 is a partially enlarged view of a portion of FIG. 8.

For example, as shown in FIG. 9, the laser beam B1 emitted from the light source L1 is reflected in the deflection angle θ1 direction by the reflecting surface 91a rotating to a first angular position R1. On the other hand, the laser beam B2 emitted from the light source L2 is reflected in the deflection angle θ1 direction (in the same direction as that of the laser beam B1) by the reflecting surface 91a rotating to a second angular position R2 different from the above-described first angular position R1.

The laser beam B1 is reflected in an optical axis direction towards the center of the photoconductive drum 21 in the main scanning direction by the reflecting surface 91a rotating to a third angular position R3. On the other hand, the laser beam B2 is reflected in an optical axis direction (in the same direction as that of the laser beam B1) towards the center of the photoconductive drum 21 in the main scanning direction by the reflecting surface 91a rotating to a fourth angular position R4 which is different from the third angular position R3.

Similarly, the laser beam B1 is reflected in the deflection angle θ1' direction by the reflecting surface 91a rotating to a fifth angular position R5. On the other hand, the laser beam B2 is reflected in the deflection angle θ1' direction (in the same direction as that of the laser beam B1) by the reflecting surface 91a rotating to a sixth angular position R6 different from the fifth angular position R5.

Since the polygon mirror 91 rotates in the CCW direction shown FIG. 9, the reflecting surface 91a rotates by changing an angle thereof to the second angular position R2, the first angular position R1, the fourth angular position R4, the third angular position R3, the sixth angular position R6, and the fifth angular position R5 in this order. Thereby, the two laser beams B1 and B2 having different incident angles along the main scanning direction can be reflected by the same reflecting surface 91a in the same direction (the optical axis direction towards the photoconductive drums 21 and 22) to be deflected in the main scanning direction at the same deflection angle.

For example, as shown in FIG. 9, an intersection between the laser beam B1 in the deflection angle θ1 direction reflected by the reflecting surface 91a rotating to the first angular position R1 and the laser beam B1 in the optical axis direction reflected by the reflecting surface 91a rotating to the third angular position R3 is set to P1. An intersection between the laser beam B2 in the deflection angle θ1 direction reflected by the reflecting surface 91a rotating to the second angular position R2 and the laser beam B2 in the optical axis direction reflected by the reflecting surface 91a rotating to the fourth angular position R4 is set to P2. In this case, the intersection P1 is located on the image plane side with respect to the intersection P2 along the optical axis direction towards the photoconductive drum 21.

Since the laser beams B1 and B2 are emitted to the surfaces of the photoconductive drums 21 and 22 at the same deflection angle, a difference (ΔZ) in the optical axis direction between the intersection P1 and the intersection P2 is set as a magnification deviation in the main scanning direction on the image plane. In other words, when the intersections P1 and P2 have the above-mentioned shift of ΔZ in the optical axis direction, the laser beam B1 reflected by the reflecting surface 91a passes at an inner side with respect to the laser beam B2 reflected by the reflecting surface 91a. In this case, a length in the main scanning direction of a spot (not shown) where the surface of the photoconductive drum 21 is irradiated with the laser beam B1 is shorter than that in the main scanning direction of a spot where the surface of the photoconductive drum 22 is irradiated with the laser beam B2.

If the light sources L1 and L2 are located at the arrangement positions according to design with respect to the polygon mirror 91, center lines in the main scanning direction along an optical axis C of the laser beams B1 and B2 reflected by the polygon mirror 91 overlap with each other and also overlap with the optical axis C. However, for example, if a relative position between the polygon mirror 91 and the light sources L1 and L2 is different from the design value, as shown in FIG. 9, the center lines of the laser beams B1 and B2 reflected by the polygon mirror 91 may be shifted from each other in the main scanning direction in some cases.

In this case, for example, if the shift (ΔX) in the main scanning direction between the center lines increases, the shift between the spots in the main scanning direction on the image planes of the laser beams B1 and B2 also increases. If the direction of the shift ΔX is reversed, the shift between the spots is also reversed. In the present embodiment, as shown in FIG. 9, the center line of the laser beam B1 reflected by the polygon mirror 91 has a shift ΔX on the minus side in the main scanning direction with respect to the center line of the laser beam B2.

Next, a method of correcting the magnification deviation in the main scanning direction is described using several embodiments as examples.

First Embodiment

According to the first embodiment, in order to correct such a magnification deviation in the main scanning direction, arrangement positions in the optical axis direction of the two fθ lenses 122 respectively provided corresponding to the laser beams B1 and B2 are adjusted.

Figure 10:
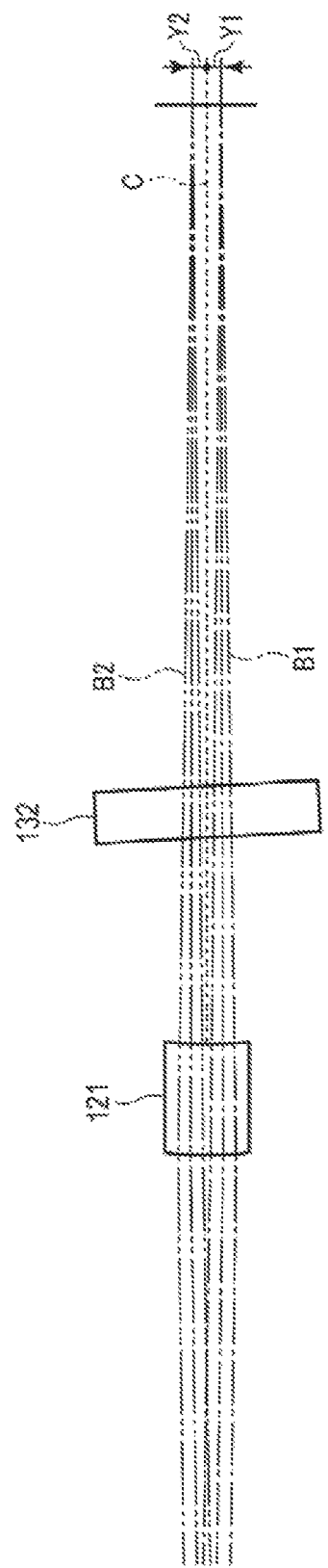
FIG. 10 is a schematic diagram of the structures shown in FIG. 8 as viewed from a side direction.

As described above, the two light sources L1 and L2 are arranged slightly shifted not only in the main scanning direction but also in the sub-scanning direction (refer to FIG. 7). For example, if the fθ lens 121 on the upstream side close to the polygon mirror 91 is set as a reference, as shown in FIG. 10, the optical axis of the laser beam B1 passes through a position away from the optical axis C of the fθ lens 121 by a distance Y1 on a side in the sub-scanning direction (i.e., lower side in FIG. 10). Similarly, the optical axis of the laser beam B2 passes through a position away from the optical axis C of the fθ lens 121 on the other side in the sub-scanning direction (i.e., upper side in in FIG. 10) by a distance Y2. The optical axes of the laser beams B1 and B2 are parallel to the optical axis C of the fθ lens 121. Y1 and Y2 are not necessarily the same.

As described above, before the laser beams B1 and B2 are reflected by the reflecting surface 91a of the polygon mirror 91, with the cylinder lenses 113Y and 113M, the laser beams B1 and B2 each have a convergence in the sub-scanning direction. For this reason, the laser beams B1 and B2 after reflection by the reflecting surface 91a have a wider width to become diffused light. However, as described above, the optical axes of the laser beams B1 and B2 are kept parallel to each other, and are orthogonal to the rotation axis 91b of the polygon mirror 91.

As described above, when the laser beams B1 and B2 are guided as the diffused light while keeping parallel to each other, it is impossible to provide a certain distance between the laser beams B1 and B2 at positions where the laser beams B1 and B2 are separated from each other so as to be guided to the photoconductive drums 21 and 22. In other words, in order to arrange reflection mirrors independently on the respective optical paths of the laser beams B1 and B2, it is necessary to provide a certain interval along the sub-scanning direction between the laser beams B1 and B2. Therefore, the fθ lens 121 has optical characteristics for converging two diffused parallel lights in the sub-scanning direction.

As shown in FIG. 10, the laser beams B1 and B2 reflected and diffused by the reflecting surface 91a of the polygon mirror 91 pass through the fθ lens 121 via positions shifted in the sub-scanning direction. At this time, since the fθ lens 121 has a positive optical power in the sub-scanning direction, the laser beam B1 is bent upwards in FIG. 10, and the laser beam B2 is bent downwards in FIG. 10.

In this way, by bending the laser beams B1 and B2 in directions to approach each other in the sub-scanning direction, the laser beams B1 and B2 intersect at a focal position (not shown in FIG. 10). In this case, the focal position is between the fθ lens 121 and the fθ lens 122.

Then, the laser beams B1 and B2 passing through the focal position are guided in directions to separate from each other in the sub-scanning direction. As a result, a distance along the sub-scanning direction occurs between the laser beams B1 and B2, thereby guiding the laser beams B1 and B2 in different directions by the reflection mirrors independently arranged.

Figure 11:
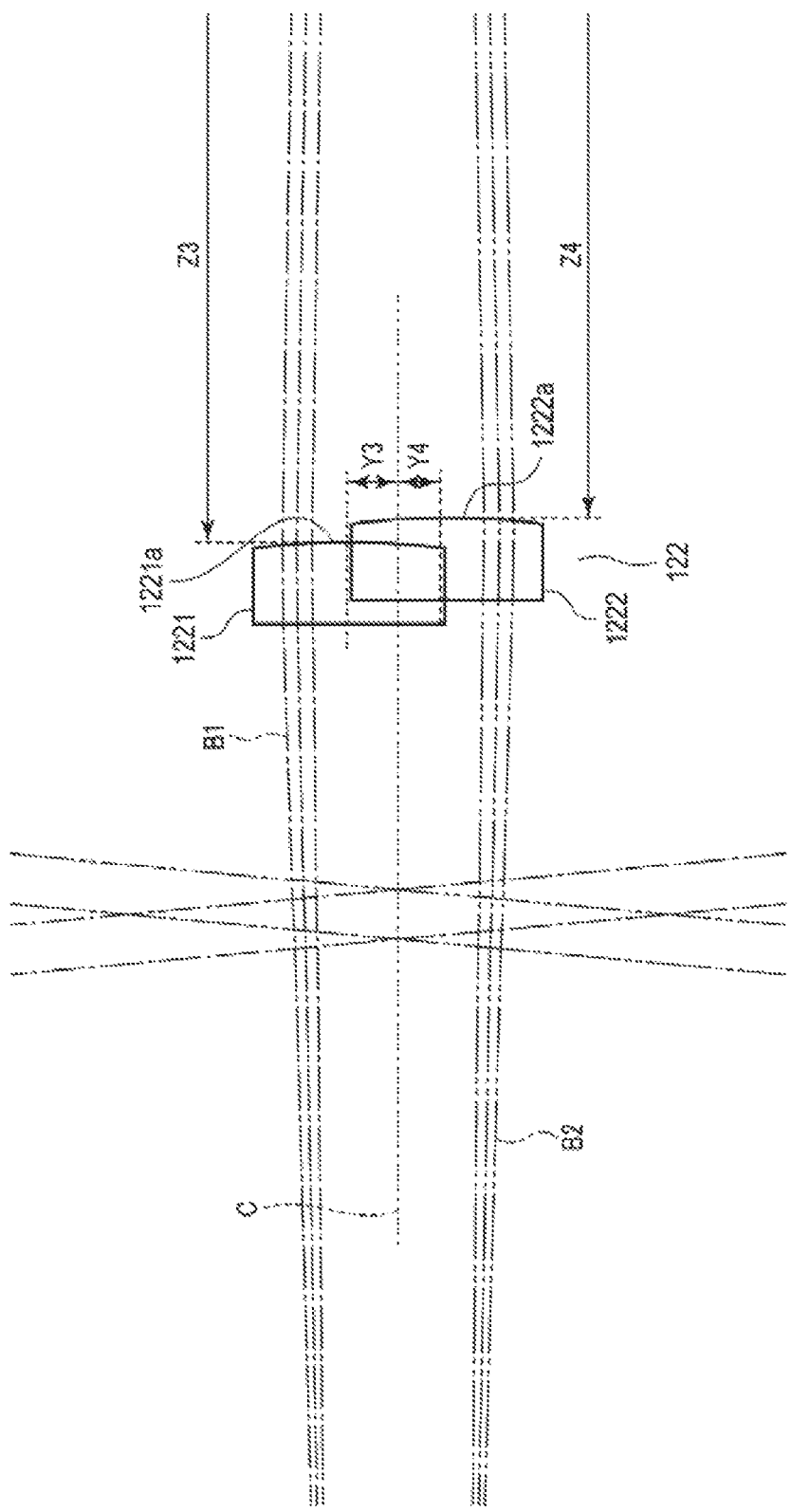
FIG. 11 is a partially enlarged view of a portion of FIG. 4.

As shown in FIG. 11, the fθ lens 122 on the downstream side close to the photoconductive drums 21 and 22 has two fθ lenses 1221 and 1222. The fθ lens 1221 is arranged at a position where the laser beam B1 is selectively transmitted. The fθ lens 1222 is arranged separately from the fθ lens 1221 at a position where the laser beam B2 is selectively transmitted. The two fθ lenses 1221 and 1222 can be independently positioned and fixed at predetermined positions.

Here, a distance between an incident surface 1221a through which the laser beam B1 is incident on the fθ lens 1221 and an emitting surface of the fθ lens 121 from which the laser beam B1 is emitted from the fθ lens 121 is defined as Z3. The incident surface 1221a of the fθ lens 1221 protrudes towards the polygon mirror 91 side to be curved. Therefore, the distance Z3 is a distance between the vertex of the incident surface 1221a and the emitting surface of the fθ lens 121.

A distance in the sub-scanning direction between an optical axis of the fθ lens 1221 and the optical axis C of the fθ lens 121 is defined as Y3. Since the laser beam B1 penetrating the fθ lens 1221 is bent in the sub-scanning direction due to the action of the fθ lens 121 as described above to intersect with the laser beam B2, the laser beam B1 passes through a position above the optical axis C of the fθ lens 121 in FIG. 11.

On the other hand, a distance between an incident surface 1222a through which the laser beam B2 is incident on the fθ lens 1222 and the emitting surface of the fθ lens 121 from which the laser beam B1 is emitted from the fθ lens 121 is defined as Z4. The incident surface 1222a of the fθ lens 1222 also protrudes towards the polygon mirror 91 side to be curved. Therefore, the distance Z4 is a distance between the vertex of the incident surface 1222a and the emitting surface of the fθ lens 121.

A distance in the sub-scanning direction between an optical axis of the fθ lens 1222 and the optical axis C of the fθ lens 121 is defined as Y4. Since the laser beam B2 penetrating the fθ lens 1222 is bent in the sub-scanning direction due to the action of the fθ lens 121 as described above to intersect with the laser beam B1, the laser beam B2 passes through a position below the optical axis C of the fθ lens 121 in FIG. 11.

As described above, since the distance Y1 in the sub-scanning direction between the optical axis of the laser beam B1 passing through the fθ lens 121 and the optical axis C of the fθ lens 121 and the distance Y2 in the sub-scanning direction between the optical axis of the laser beam B2 passing through the fθ lens 121 and the optical axis C of the fθ lens 121 are not necessarily the same, Y3 and Y4 are not necessarily the same as well. However, the positions of the two fθ lenses 1221 and 1222 in the main scanning direction are the same.

In the present embodiment, as shown in FIG. 11, the fθ lens 1221 for transmitting the laser beam B1 is arranged at a position closer to the image plane with respect to the fθ lens 1222 so as to make Z3 slightly longer than Z4. If the two fθ lenses 1221 and 1222 are arranged in such a positional relationship, as shown in FIG. 12 and FIG. 13, it is possible to match the magnification in the main scanning direction of the spots on the image planes of the laser beams B1 and B2 after penetrating the two fθ lenses 1221 and 1222.

Figure 12:
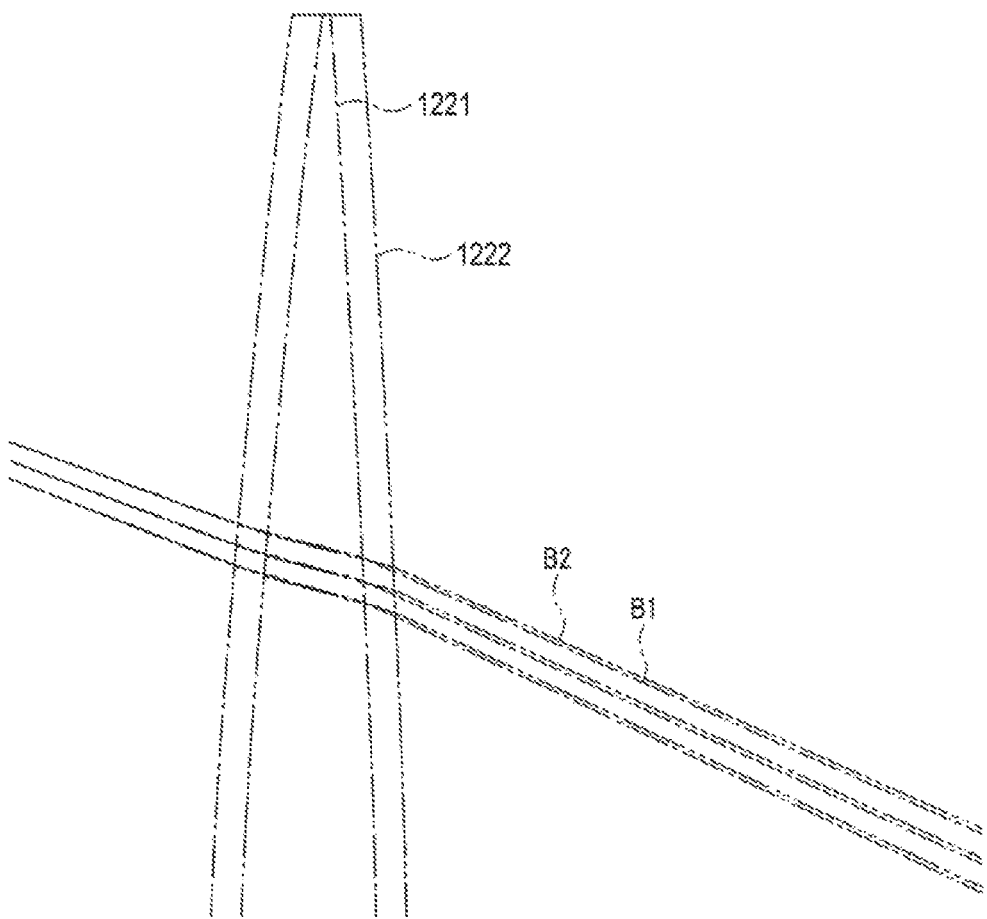
FIG. 12 is a partially enlarged view of the vicinity of ends of the two fθ lenses in FIG. 11 on a plus side in a main scanning direction as viewed from above.
Figure 13:
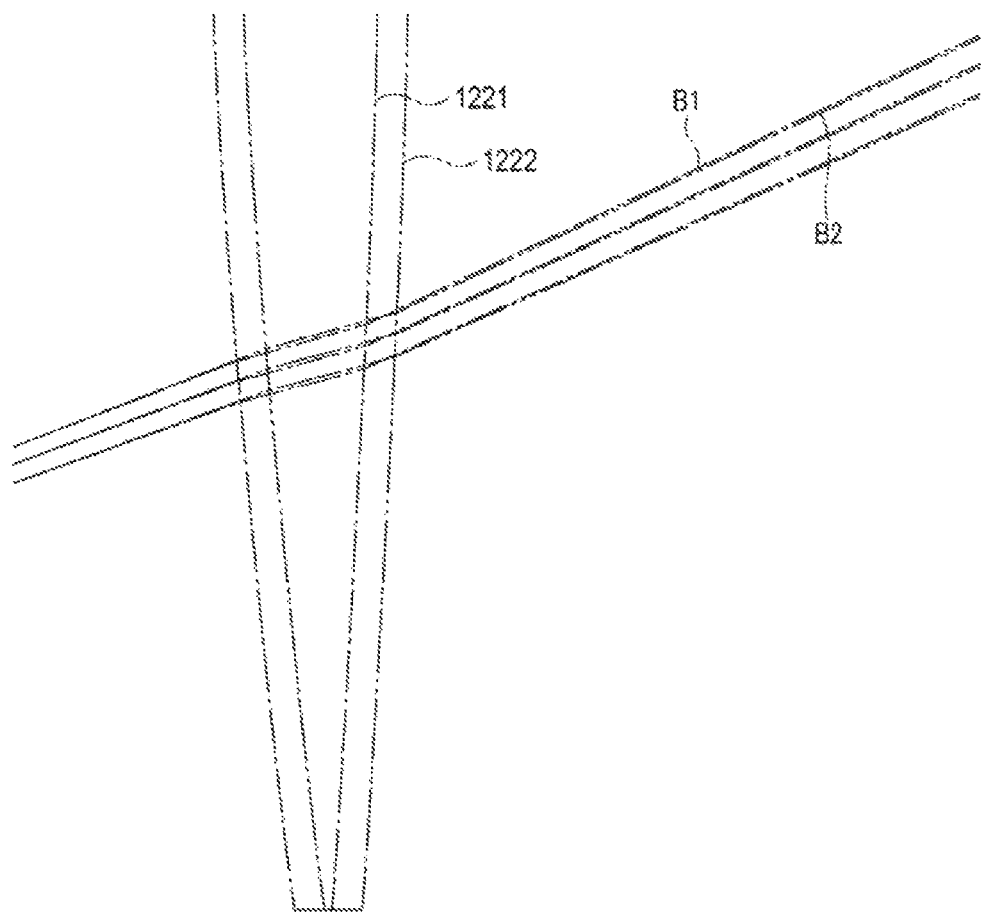
FIG. 13 is a partially enlarged view of the vicinity of ends of the two fθ lenses in FIG. 11 on a minus side in a main scanning direction as viewed from above.

FIG. 12 is a diagram illustrating the vicinity of the end on the plus side in the main scanning direction of the fθ lens 122 (1221, 1222) on the downstream side as viewed from the rotation axis direction of the polygon mirror 91, and FIG. 13 is diagram illustrating the vicinity of the end on the minus side in the main scanning direction of the fθ lens 122 on the downstream side as viewed from the rotation axis direction of the polygon mirror 91.

At the time of transmitting the laser beams B1 and B2 deflected in the main scanning direction by the rotation of the polygon mirror 91, the fθ lens 122 bends the laser beams B1 and B2 towards the inner side in the main scanning direction as shown in FIG. 11. Therefore, if the positions in the optical axis direction of the two fθ lenses 1221 and 1222 are shifted from each other as shown in FIG. 11, the positions at which the laser beams B1 and B2 are bent are shifted from each other in the optical axis direction, and the magnification deviation in the main scanning direction between the laser beams B1 and B2 is corrected.

Specifically, in the present embodiment, the laser beam B1 emitted from the light source L1 arranged on the downstream side in the rotation direction CCW of the polygon mirror 91 is incident on the fθ lens 122 at the inner side in the main scanning direction with respect to the laser beam B2 emitted from the light source L2 arranged on the upstream side in the rotation direction CCW. Therefore, by refracting the laser beam B2 on the upstream side in the optical axis direction before the laser beam B1, the magnification in the main scanning direction of the laser beams B1 and B2 can be aligned.

As described above, in the present embodiment, the light beam incident position of the fθ lens 1221 transmitting the laser beam B1 emitted from the light source L1 on the downstream side in the rotation direction of the polygon mirror 91 is located on the downstream side in the optical axis direction close to the image plane with respect to the light beam incident position of the fθ lens 1222 transmitting the laser beam B2 emitted from the light source L2 on the upstream side in the rotation direction among the fθ lenses 1221 and 1222 on the downstream side close to the image plane. Therefore, according to the present embodiment, without changing the structure of the polygon mirror 91, it is possible to correct the magnification deviation in the main scanning direction between the spots on the image planes with a simple configuration.

Second Embodiment

Hereinafter, a second embodiment is described with reference to FIG. 14.

In the second embodiment, the light beam incident positions of the two fθ lenses 1221 and 1222 are shifted in the sub-scanning direction instead of being shifted in the optical axis C as in the first embodiment described above. Since the other configurations are substantially the same as those of the above-described first embodiment, the description of the configurations having the same functions as the above-described first embodiment is omitted.

As described above, the fθ lenses 1221 and 1222 are curved in such a manner that their incident surfaces 1221a and 1222a protrude outwards towards the light sources L1 and L2 side. Therefore, thicknesses in the optical axis direction of the fθ lenses 1221 and 1222 are slightly different in the sub-scanning direction. In other words, a distance when the laser beams B1 and B2 pass through the thicker portion is slightly longer than that when the laser beams B1 and B2 pass through the thinner portion.

For the fθ lenses 1221 and 1222, the thickness thereof in the optical axis direction becomes thinner in directions from the center to both ends in the sub-scanning direction. Therefore, in the present embodiment, a distance Y5 between the optical axis of the fθ lens 1221 and the optical axis C of the fθ lens 121 is set so that the laser beam B1 passes through the thin portion of the fθ lens 1221. In the present embodiment, a distance Y6 between the optical axis of the fθ lens 1222 and the optical axis C of the fθ lens 121 is set so that the laser beam B2 passes through the thick portion of the fθ lens 1222, i.e., the center in the sub-scanning direction thereof. As a result, in the present embodiment, Y5<Y6.

Figure 14:
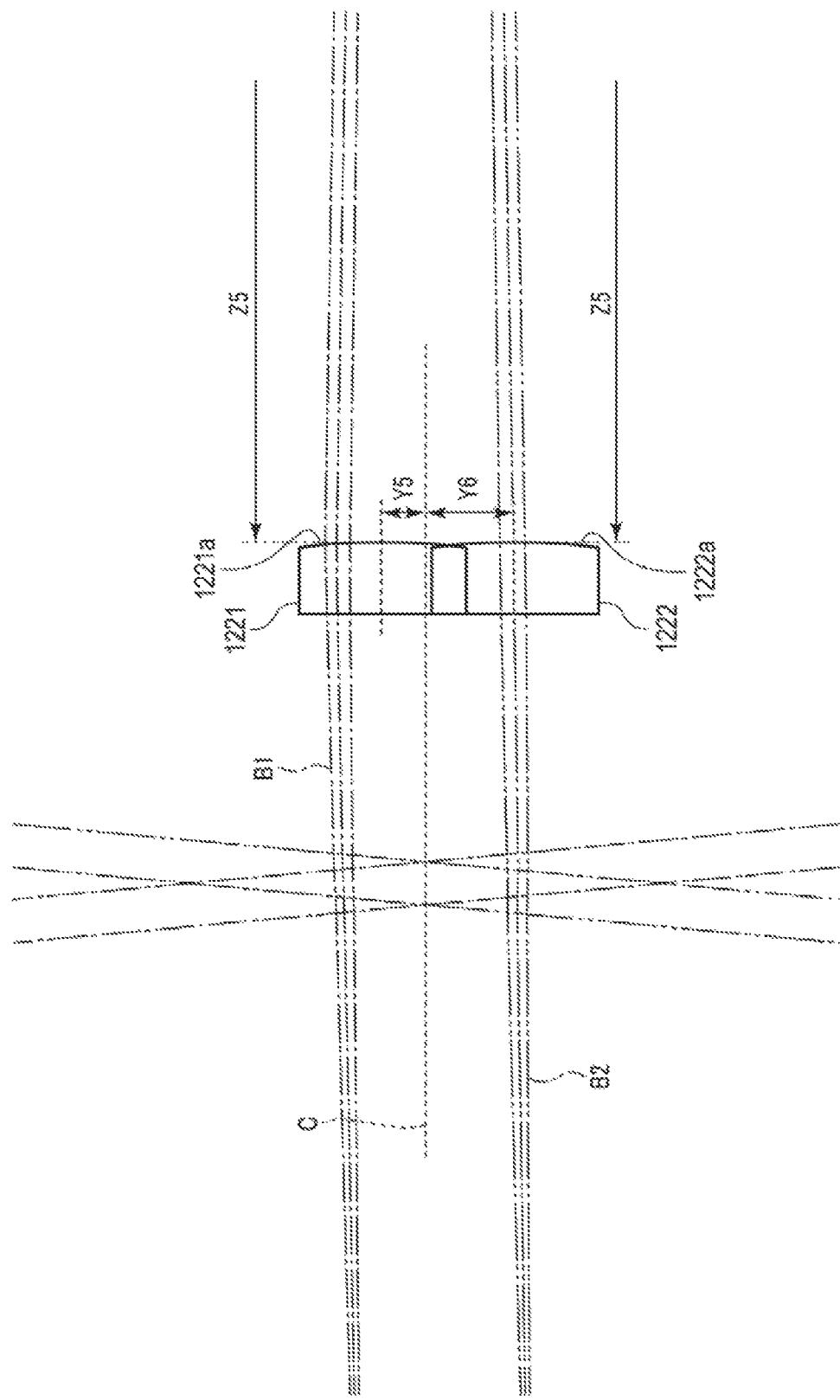
FIG. 14 is a partially enlarged view of an exposure unit according to a second embodiment.

In the present embodiment, as shown in FIG. 14, the distance between the emitting surface of the fθ lens 121 and the incident surface 1221a of the fθ lens 1221 is set to Z5, and the distance between the emitting surface of the fθ lens 121 and the incident surface 1222a of the fθ lens 1222 is also set to Z5. As a result, the incident surface 1221a of the fθ lens 1221 is closer to the image plane side with respect to the incident surface 1222a through which the laser beam B2 is incident on the fθ lens 1222 at the light beam incident position where the laser beam B1 is incident on the fθ lens 1221.

Thus, as in the first embodiment described above, the magnification in the main scanning direction of the spot formed by the laser beam B1 on the surface of the photoconductive drum can match with the magnification in the main scanning direction of the spot formed on the surface of the photoconductive drum 22 by the laser beam B2 incident on the polygon mirror 91 at the incident angle different from that of the laser beam B1, and thus, the magnification deviation in the main scanning direction on the image plane can be corrected.

Third Embodiment

Next, a third embodiment is described with reference to FIG. 15.

In the third embodiment, the two fθ lenses 1221 and 1222 are inclined by being rotated in the same direction around an axis along the main scanning direction rather than shifting the arrangement positions of the two fθ lenses 1221 and 1222 in the direction of the optical axis C as in the above-described first embodiment or in the sub-scanning direction as in the above-described second embodiment. Since the other configurations are substantially the same as those of the above-described first embodiment, the description of the configurations having the same functions is omitted.

In the present embodiment, two fθ lenses 1221 and 1222 are arranged at positions where vertex of the incident surfaces 1221a and 1222a are arranged at positions away from the emitting surface of the fθ lens 121 in the direction of the optical axis C by the same distance (Z7). In the present embodiment, the vertex of the incident surfaces 1221a and 1222a of the fθ lenses 1221 and 1222 are arranged at positions away from the optical axis C of the fθ lens 121 by the same distance (Y7) in the sub scanning direction. Then, the fθ lenses 1221 and 1222 are inclined in the same direction at the same angle (a7) around the vertex.

Figure 15:
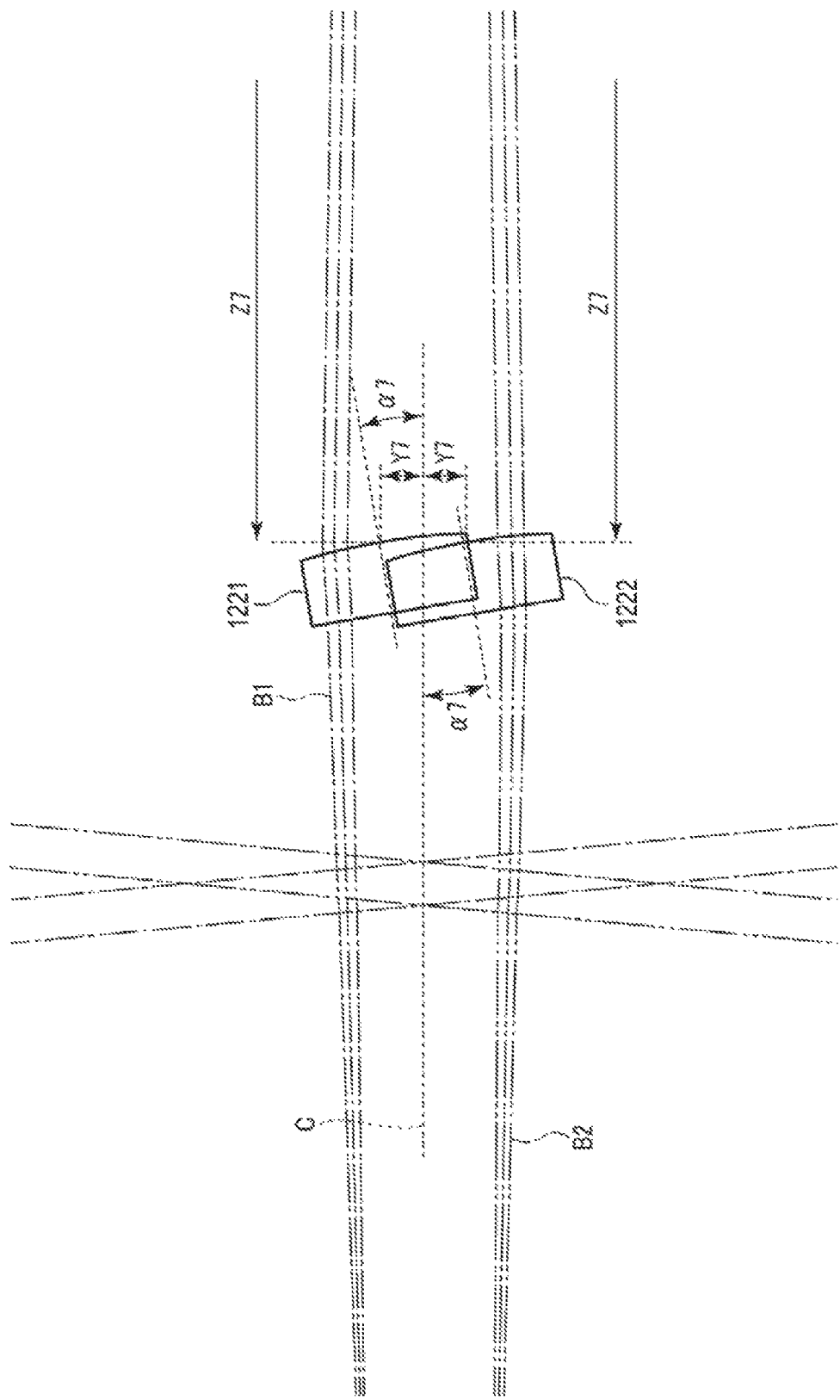
FIG. 15 is a partially enlarged view of an exposure unit according to a third embodiment.

As a result, as shown in FIG. 15, at the light beam incident position where the laser beam B1 is incident on the fθ lens 1221, the incident surface 1221a of the fθ lens 1221 is closer to the image plane side along the optical axis C with respect to the incident surface 1222a through which the laser beam B2 is incident on the fθ lens 1222.

Therefore, in the present embodiment, as in the first embodiment described above, the magnification in the main scanning direction of the spot formed by the laser beam B1 on the surface of the photoconductive drum 21 can match with the magnification in the main scanning direction of the spot formed on the surface of the photoconductive drum 22 by the laser beam B2 incident on the polygon mirror 91 at the incident angle different from that of the laser beam B1, and thus, the magnification deviation in the main scanning direction on the image plane can be corrected.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the above-described embodiment, the photoconductive drums 21, 22, 23 and 24 and the light sources L1, L2, L3 and L4 for respective colors are respectively arranged in two sets on the left side and the right side with the polygon mirror 91 therebetween; however, the photoconductive drums and the light sources for all the colors may be arranged on one side of the polygon mirror 91. In this case, four fθ lenses 122 are provided on the downstream side of the common fθ lens 121, and the positions of each fθ lenses 122 in the optical axis direction and the sub-scanning direction are shifted based on a difference in the incident angles of the laser beams B1, B2, B3 and B4 emitted from the respective light sources.

What is claimed is:

1. An optical scanning device comprising:
    a plurality of light sources including first and second light sources that are adjacent to each other;
    a deflector configured to rotate about a rotation axis and deflect light beams emitted from the plurality of light sources, wherein the rotation axis is perpendicular to a direction along which the first and second light sources are arranged;
    a first lens configured to transmit the light beams deflected by the defector; and
    a plurality of second lenses configured to guide the light beams transmitted from the first lens to respective surfaces to be scanned, wherein
    the second lenses are arranged so that a first incident position of a first light beam emitted by the first light source and entering one of the second lenses is closer to the respective surface to be scanned than a second incident position of a second light beam emitted by the second light source and entering another of the second lenses, and
    an incident angle of the second light beam after deflection with respect to an optical axis of the first lens is greater than an incident angle of the first light beam after deflection with respect to the optical axis of the first lens.

2. The optical scanning device according to claim 1, wherein
    the first and second light source are arranged at different angular positions along a rotation direction of the deflector.

3. The optical scanning device according to claim 1, wherein
    each of the second lenses has a different thickness in a direction intersecting with both the optical axis and a direction scanning the respective surface.

4. The optical scanning device according to claim 3, wherein
    the one of the second lenses is arranged at a different position from the other of the second lenses along the direction intersecting with both the optical axis and the scanning direction.

5. The optical scanning device according to claim 1, wherein
    optical axes of the second lenses that are adjacent to each other are parallel to each other.

6. The optical scanning device according to claim 1, further comprising:
    a plurality of pre-deflection optical systems between the respective light sources and the deflector.

7. The optical scanning device according to claim 6, wherein
    each pre-deflection optical system comprises a finite focus lens, a diaphragm, and a cylinder lens.

8. The optical scanning device according to claim 7, further comprising:
    a cover glass between each pre-deflection optical system and the deflector.

9. The optical scanning device according to claim 1, further comprising:
    a cover glass between the deflector and the first lens.

10. The optical scanning device according to claim 1, further comprising:
    a cover glass between one of the second lenses and the respective surface to be scanned.

11. An image forming apparatus comprising:
    a plurality of image carriers having respective surfaces to be scanned;
    an optical scanning device that comprises:
        a plurality of light sources each corresponding to one of the plurality of image carriers, the plurality of light sources including first and second light sources that are adjacent to each other;
        a deflector configured to rotate about a rotation axis and deflect light beams emitted from the plurality of light sources, wherein the rotation axis is perpendicular to a direction along which the first and second light sources are arranged;
        a first lens configured to transmit the light beams deflected by the defector; and
        a plurality of second lenses configured to guide the light beams transmitted from the first lens to the respective surfaces to be scanned, wherein
            the second lenses are arranged so that a first incident position of a first light beam emitted by the first light source and entering one of the second lenses is closer to the respective surface to be scanned than a second incident position of a second light beam emitted by the second light source and entering another of the second lenses, and
            an incident angle of the second light beam after deflection with respect to an optical axis of the first lens is greater than an incident angle of the first light beam after deflection with respect to the optical axis of the first lens; and
    an image forming unit configured to form an image on an image receiving medium using a latent image formed on the respective surface to be scanned.

12. The image forming apparatus according to claim 11, wherein
the first and second light source are arranged at different angular positions along a rotation direction of the deflector.

13. The image forming apparatus according to claim 11, wherein
each of the second lenses has a different thickness in a direction intersecting with both the optical axis and a direction scanning the respective surface.

14. The image forming apparatus according to claim 13, wherein
the one of the second lenses is arranged at a different position from the other of the second lenses along the direction intersecting with both the optical axis and the scanning direction.

15. The image forming apparatus according to claim 11, wherein
optical axes of the second lenses that are adjacent to each other are parallel to each other.

16. The image forming apparatus according to claim 11, wherein
the optical scanning device comprises a plurality of pre-deflection optical systems between the respective light sources and the deflector.

17. The image forming apparatus according to claim 16, wherein
each pre-deflection optical system comprises a finite focus lens, a diaphragm, and a cylinder lens.

18. The image forming apparatus according to claim 17, wherein
the optical scanning device comprises a cover glass between each pre-deflection optical system and the deflector.

19. The image forming apparatus according to claim 11, wherein
the optical scanning device comprises a cover glass between the deflector and the first lens.

20. The image forming apparatus according to claim 11, wherein
the optical scanning device comprises a cover glass between one of the second lenses and the respective surface to be scanned.

* * * * *